US010399087B2

(12) United States Patent
Bakeev et al.

(10) Patent No.: US 10,399,087 B2
(45) Date of Patent: Sep. 3, 2019

(54) WET MINERAL ORE PROCESSING IN MINING APPLICATIONS

(71) Applicant: Solenis Technologies, L.P., Schaffhausen (CH)

(72) Inventors: Kirill N Bakeev, Newark, DE (US); Andrew M DiMaio, Oxford, PA (US)

(73) Assignee: SOLENIS TECHNOLOGIES, L.P., Schaffhausen (CH)

( * ) Notice: Subject to any disclaimer, the term of this patent is extended or adjusted under 35 U.S.C. 154(b) by 952 days.

(21) Appl. No.: 14/843,411

(22) Filed: Sep. 2, 2015

(65) Prior Publication Data

US 2016/0059152 A1 Mar. 3, 2016

Related U.S. Application Data

(60) Provisional application No. 62/045,356, filed on Sep. 3, 2014.

(51) Int. Cl.
*C02F 1/56* (2006.01)
*C22B 1/00* (2006.01)
*B01D 21/01* (2006.01)
*B02C 23/06* (2006.01)
*B02C 23/18* (2006.01)
*B02C 23/36* (2006.01)
*C02F 103/10* (2006.01)

(52) U.S. Cl.
CPC ............... *B02C 23/06* (2013.01); *B01D 21/01* (2013.01); *B02C 23/18* (2013.01); *B02C 23/36* (2013.01); *C02F 1/56* (2013.01); *C22B 1/00* (2013.01); *C02F 2103/10* (2013.01)

(58) Field of Classification Search
CPC .......... B02C 23/06; B02C 23/18; B02C 23/36
USPC ..................................................... 241/16, 21
See application file for complete search history.

(56) References Cited

U.S. PATENT DOCUMENTS

| | | | |
|---|---|---|---|
| 3,950,182 A | 4/1976 | Steel et al. | |
| 4,126,276 A * | 11/1978 | Manfroy | B02C 23/06 |
| | | | 241/16 |
| 4,162,004 A | 7/1979 | Thomas | |
| 4,162,044 A | 7/1979 | Manfroy et al. | |
| 4,522,968 A | 6/1985 | Horacek | |
| 4,529,782 A | 7/1985 | Fan et al. | |
| 4,701,264 A | 10/1987 | Braun | |
| 5,326,854 A * | 7/1994 | Stahl | C08F 226/06 |
| | | | 210/732 |
| 7,875,188 B2 | 1/2011 | Dymond et al. | |
| 8,097,167 B2 | 1/2012 | Moody et al. | |
| 8,323,509 B2 | 12/2012 | Dymond et al. | |
| 2010/0331484 A1* | 12/2010 | Swift | C02F 1/56 |
| | | | 524/595 |

FOREIGN PATENT DOCUMENTS

| | | |
|---|---|---|
| EP | 0055489 | 12/1981 |
| EP | 0055489 A1 | 7/1982 |

OTHER PUBLICATIONS

Canadian Intellectual Property Office, Official Action in Canadian Patent Application No. 2,963,783 dated Feb. 26, 2018.
The International Bureau of WIPO, International Preliminary Report on Patentability in Application No. PCT/US2015/048121, dated Mar. 7, 2017.
International Search Report, PCT /US2015/048121, p. 2, dated Nov. 5, 2015.
State Intellectual Property Office, Office Action issued in CN Application No. 201580058503.7, dated Jul. 25, 2018.
Canadian Intellectual Property Office, Notice of Allowance issue din CA Patent Application No. 2,963,783, dated Nov. 6, 2018.

* cited by examiner

*Primary Examiner* — Shelley M Self
*Assistant Examiner* — Jared O Brown
(74) *Attorney, Agent, or Firm* — Lorenz & Kopf, LLP

(57) ABSTRACT

A process for enhancing mining processes and in particular to the combination of anionic grinding aids with cationic flocculating agents, an anionic flocculant containing sulphonated and/or carboxylated groups, a terpolymer and combinations thereof at the flocculating stage in mineral ore processing applications, thereby enhancing the effectiveness of mining processes particularly in the grinding and flocculating of the mineral ore slurry.

20 Claims, No Drawings

WET MINERAL ORE PROCESSING IN MINING APPLICATIONS

This application claims the benefit of U.S. provisional application No. 62/045,356, filed 3 Sep. 2014, the entire contents of which are hereby incorporated by reference.

BACKGROUND

The invention relates to the combination of anionic grinding aids with cationic flocculating agents, an anionic flocculant containing sulphonated and/or carboxylated groups, a terpolymer and combinations thereof at the flocculating stage in mineral ore processing applications, thereby enhancing the effectiveness of mining processes particularly in the grinding and flocculating of the mineral ore slurry. The combinations of grinding aid and flocculants taught in the present application, will allow one to achieve optimum compatibility between grinding aid and flocculant(s) thereby improving the processing of mineral ores without negatively impacting at the flocculating stage. Typically the grinding aids are added to a mineral ore slurry prior to or during the process of comminuting the mineral ore in a mineral mining process. This slurry generally goes through additional process steps including wherein the mineral ore slurry is thickened by a flocculant before being further processed to obtain the desired product.

The grinding of mineral ore is a very energy intensive and inefficient stage of mineral ore processing. In an effort to make the process more efficient and cost effective, mechanical and chemical adaptations have been developed to facilitate the comminution of mineral ore. One such adaptation is the introduction of chemicals which are effective in making the grinding process more efficient. These classes of chemicals are generally anionic and can be referred to as grinding aids. Grinding aids can lower the total energy of the comminution (i.e. grinding) process while allowing for more efficient throughput of mineral ore. These chemical additives also have been shown to increase the level of fines produced during the grinding stage thus increasing grinding efficiency.

In mining applications and processes other chemicals and additives are usually added downstream from the grinding/comminuting operation to aid in processing and recovery of the desired product. In mining operations, after the grinding and comminuting of the mineral ore is accomplished, there are subsequent steps wherein the previously diluted mineral ore slurry is pumped through a conduit to a thickener tank and thickened by adding a flocculant at a flocculation stage or a similar step and further processed to obtain the desired product.

The role of the flocculant is to promote phase separation in a multi-phase system. The role of the flocculant is to enhance aggregation of the fine particles which is important in the mineral recovery strategy. However, the flocculants used in mining and mineral processing may be counteracted by the presence of grinding aids and are limited in their compatibility with grinding aids. We found a way to enhance and improve wet mineral ore grinding in mining operations through the use of a combination anionic grinding aid with flocculant. Therefore, what is needed in processing mineral ore is a combination of grinding aids and flocculants that will enhance and improve wet mineral ore grinding in mining operations.

Generally, grinding is the process in a commercial mining operation in which larger fragments of ore are broken down to particles of very fine particle sizes, i.e. the fines. The valuable minerals are extracted from the fines. The grinding process occurs in one or more means for comminuting mineral ore, such as ball mills, rod mills, autogenous mills, semi-autogenous ("SAG") mills, pebble mills, high pressure grinding mills, burnstone mills, vertical shift impactor mills, tower mills and the like. Ball mills, SAG mills, rod mills and high pressure grinding roll mills are often used in industrial mining operations. Grinding aid compositions facilitates the comminution of the mineral ore fragments in the mineral ore slurry thus allowing grinding to the desired particle size with less total energy requirements or higher throughput. Grinding aid compositions also affects the rheology of the mineral ore slurry allowing it to flow within the mill better, with less agglomeration, allowing more efficient grinding of the mineral ore.

The mineral ore slurry comprising water and mineral ore is added to the mill either continuously, such as through a feed pipe, or manually. Typically, in mineral ore recovery processes a grinding aid composition is added to the mineral ore slurry either prior to the mineral ore slurry entering a grinding chamber(s) of the mill, such as in the feed pipe, prior to comminution or is added to the slurry when the slurry is in a grinding chamber(s) of the mill. Also, the grinding aid can be added to the mineral ore slurry both prior to the mineral ore slurry entering the mill and while the mineral ore slurry is in the grinding chamber(s) of the mill.

Once the mineral ore has been ground and comminuted to the desired size, the comminuted material is transferred for further processing. This can be a continuous process or batch process wherein the diluted comminuted material goes through a flocculation step or stage to promote phase separation and concentration of the ore being processed. The flocculants promote aggregation of the fine particles which is an important component of mineral recovery strategy.

We have found through extensive research that certain flocculants in the presence of anionic grinding aids can enhance the processing of the mineral ore by increasing the desired phase separation in the flocculation stage of the mining process. In particular we have found that anionic grinding aid when used in combination with certain cationic flocculants, carboxylated and/or sulphonated anionic flocculants and terpolymers significantly reduce negative interactions between the grinding aid and flocculant, thereby enhancing the processing of the ore and improving efficiency. The mining industry is constantly seeking new additive technologies that will increase the efficiency of the comminution process and overall ore recovery in mineral mining operations.

All parts and percentages set forth herein are on a weight-by weight basis unless otherwise indicated.

SUMMARY OF THE INVENTION

A process useful in mineral ore processing and recovery is described herein. The process involves anionic grinding aids followed by a flocculant(s) at a flocculating stage in mining operations. Grinding aids are typically added to a mineral slurry prior to or during a grinding stage in a mineral ore recovery process while a flocculant can be added at any point subsequent to the grinding step, it is usually added at a thickener tank downstream from the grinding operation. Thus, the invention encompasses mineral ore slurry comprising an aqueous phase of a mineral ore and an anionic grinding aid in an amount effective to comminute the mineral ore and at least one cationic, anionic and/or terpolymer flocculant to aid in the flocculating stage.

DETAILED DESCRIPTION OF THE INVENTION

In one aspect, the present invention provides for a process of wet grinding and flocculating a mineral ore wherein the mineral ore is provided in the presence of a liquid medium and at least one anionic grinding aid to yield an aqueous slimy; grinding the aqueous slurry with a means for comminuting the mineral ore; further diluting the mineral ore for transporting to a thickener tank; and adding a flocculant to flocculate the comminuted mineral ore at a flocculation or thickening stage before final recovery of the desired product.

In one embodiment of the invention, an anionic grinding aid composition is added to the mineral slurry, which is the aqueous slurry comprising the mineral ore, and the terms are used interchangeably throughout the application. The anionic grinding aid can be added in an amount of from about 0.005% to about 1.0% by dry weight of the mineral ore and can be in an amount of about 0.01% to about 0.40% by dry weight of the mineral ore. Although the grinding aid composition is effective at a variety of solids content of the mineral slurry (amount of mineral ore or mineral ore content in the aqueous slurry), the solids content of the aqueous slurry is at least about 30%, can be at least about 50%, and may be from about 60% to about 80% solids or higher. Persons of ordinary skill in the art, after reading this disclosure, will appreciate that all ranges and values for the amount of grinding aid composition and solids content are contemplated.

In one embodiment, a process of wet grinding and flocculating a mineral ore comprising:
providing the mineral ore in the presence of a liquid medium and at least one anionic grinding aid to yield an aqueous slurry; grinding the aqueous slurry with a means for comminuting the mineral ore; and downstream from the grinding operation adding at least one anionic flocculating agent containing carboxylated or sulphonated groups.

In another embodiment, the flocculating agent is selected from a cationic, anionic, terpolymer or combinations thereof. In one aspect, the flocculating agent can be anionic containing sulphonated or carboxylated groups.

In yet another embodiment, the flocculating agent is a terpolymer and/or combinations thereof at a flocculating step or stage in the mineral ore processing application.

In another embodiment of the invention, the mineral ore comprises a component selected from the group consisting of a precious metal, a base metal, coal, phosphate and combinations thereof.

In yet another embodiment, the mineral ore comprises a mineral selected from the group consisting of gold, aluminum, silver, platinum, copper, nickel, zinc, lead, molybdenum, iron and combinations thereof.

In another embodiment of the invention the aqueous slurry has a mineral ore content of at least about 30% by weight; or at least about 50% by weight; or from about 60% by weight to about 80% by weight.

In another embodiment of the invention, the means for comminuting the mineral ore is selected from the group consisting of a ball mills, rod mills, autogenous mills, semi-autogenous mills, pebble mills, high pressure grinding mills, burnstone mills, vertical shift impactor mills and tower mills.

In another embodiment of the invention the grinding aid is added to the aqueous slurry in an amount of about 0.01% to about 1.0% by dry weight of the mineral ore; or from about 0.01 to about 0.40% by dry weight of the mineral ore.

In another embodiment of the invention, the pH of the aqueous slurry with grinding aid added is from about 4 to about 12; or from about 6 to about 10; or from about 8 to about 9.

In another embodiment of the invention, the at least one flocculating agent can be linear, branched or crosslinked.

In another embodiment of the invention, the flocculating agent is added to the aqueous slurry in an amount of from about 0.0625% by dry weight of ore to about 0.125% per dry wt. of ore; or from about 0.075% by dry wt. of ore to about 0.100% by dry wt. of ore.

In another embodiment of the invention, the at least one flocculating agent is cationic.

In another embodiment of the invention the viscosity of the cationic flocculating agent is from about 400 centipoise (cP) to about 700 cP, or from about 500 cP to about 600 cP and a charge of less than 17%, or less than 10%; or less than 2%. Hereinafter when referring to the charge of the flocculant, it refers to the mole % of charged groups of the polymeric flocculant.

In yet another embodiment of the invention, the anionic flocculant contains sulphonated groups, wherein the viscosity is about 90 cP or above; and can be from about 90 cP to about 230 cP and the charge is less than 18%.

In another embodiment, the anionic flocculating agent contains carboxylated groups, wherein the viscosity is greater than about 90 cP or above and has a molar charge of greater than about 18%.

In another embodiment, the at least one flocculating agent is a terpolymer, wherein the viscosity is about 90 cP or above; and can be from about 90 cP to about 230 cP and the charge is less than 18%.

In another embodiment the monomers comprising the flocculant can be selected from acrylic acid (AA), acrylamide (AAm), 2-acrylamido-2-methylpropanesulfonic acid (AMPS), acrylamidopropyl trimethylammonium chloride (APTAC), dimethylammoniummethyl (meth)acrylate quaternized with methyl chloride (ADAMEQuat), dimethylamine ethylmethacrylate quaternized with methyl chloride (DMAEMAQuat), maleic anhydride and its hydrolyzed derivatives, polyvinylamine (PVA) and it's quaternized derivatives, polyethyleneimine (PEI) and it's quaternized derivatives, polyethylene oxide (PEO), polyethylenediamine, poly-N-alkyl-vinylpyridinium halide, polystyrenesulfonate, and can be other anionic and cationic equivalents.

EXAMPLES

The following grinding technique was applied for all subsequent examples.

An all-direction planetary laboratory ball mill was used in the operation for comminuting or grinding the ore samples. A general procedure for ore grinding was as follows (unless specified differently). Variable amounts of dry ore and variable amounts of tap water were loaded into 1 liter 316 stainless steel cups with the grinding aid composition added prior to grinding as per the individual examples below. Fifteen, 20 millimeter (mm), 316 stainless steel balls were placed in each loaded cup. The cups were fixed in the ball mill. Grinding was performed using 20 Hertz (Hz) energy input for 20 minutes for both a North & South American gold ore. In order to adjust the wet ore (slurry) concentration, a constant amount of ore was used with a variable amount of water to obtain mineral ore slurries having mineral ore content (% slurry) as identified here. Grinding was conducted at 60 wt % slurry with gold ore received from the North American mine and at 65 wt % slurry with gold ore received from the South American mine.

The ground mineral ore/mineral ore slurry was then dried and analyzed for particle size distribution, using the following analytical procedure.

Dry Particle Size Analysis

Particle size distribution was analyzed using a HELOS dry particle size analyzer from Sympatec GmbH, Clausthal-Zellerfield, Germany in accordance with manufacturer's instructions. The particle size distribution was calculated by placing a powder sample of dried comminuted mineral, about ½ teaspoon in volume, on the vibrating table of the HELOS dry particle size analyzer. The sample was automatically dispersed through the laser system and the distribution curve was calculated automatically through the software embedded in the analyzer. Entire cumulative size distributions with mean numbers were summarized.

Viscosity Measurements

The following procedure was used to test the viscosity of the cationic flocculants.

In a 400 milliliter (ml) beaker 1.7±0.01 grams (g) of ground ore was weighed. Then 304.3±0.1 g demineralized water (22±3° C.) was added in such a way that the ore was distributed in the dissolving water without the formation of lumps. The solution is stirred immediately with the finger stirrer for about 60 minutes or about 90 minutes at 200±10 revolutions per minute (rpm), depending upon the particular recipe (when using fine products the number of revolutions of the finger stirrer may be increased up to 300 revolutions per minute (rpm) for approximately 1 minute). Then 34±0.1 g NaCl was added, evenly distributed over a period of 1 minute at 300 to 500 rpm and dissolved within 15 minutes by stirring continuously at 200±10 rpm. After the solution reached a constant temperature of 20±1° C. the sample was not stirred for 15 minutes at which time it was stirred at 200 rpm for 1 minute. Spindle No. 1 was slowly immersed and the viscosity determined with a Brookfield viscometer at 10 rpm. The measurement was terminated when the reading remained constant for a period of 30 seconds.

The following procedure was followed for determining the viscosity of the anionic flocculants: In a 400 ml beaker 1.7±0.01 grams (g) of mineral ore was weighed. Then 304.3±0.1 g of demineralized water (22±3° C.) were added in such a way that the ore is distributed in the water without the formation of lumps. The solution was then stirred immediately with the finger stirrer for about 60 or about 90 minutes at 200±10 rpm, depending upon the particular recipe (when using fine products the number of revolutions of the finger stirrer may be increased up to 300 rpm for approx. 1 minute). Then 34±0.1 g NaCl are added, evenly distributed over a period of 1 minute at 300 to 500 rpm and dissolved within 15 minutes by stirring continuously at 200±10 rpm. After the solution reaches a constant temperature of 20±1° C. it has to rest for 15 minutes and then stirred at 200 rpm for 1 minute. Spindle No. 1 is slowly immersed and the viscosity determined with a Brookfield viscometer at 10 rpm. The measurement is terminated when the reading remains constant for a period of 30 seconds.

Solid-liquid-separation tests were conducted for the ground gold are pre-diluted from 60 wt % and 65 wt % down to 10 wt % with distilled water. The pH of all slurries was around 9.

Settling Test Procedure in Solid-Liquid-Separation

A one liter (1) graduated cylinder was filled to the one-liter mark and using a plunger, the slurry is plunged vigorously with 10 plunges to ensure complete mixing of the slurry as well as shear any remaining flocculated particles. Then half of the polymer dose is injected into the 1-liter graduated cylinder, and two additional vigorous plunges are made to disperse the flocculant followed by an additional gentler plunge. The other half of the flocculant dose is injected into the same 1-liter graduate cylinder and three additional relatively gentle plunges are made to promote flocculant growth. The height of the liquid/solid interface is tracked every 100 milliliter (ml) until the 700 ml mark is reached and every 50 ml thereafter. A timer is set once the stop-watch has been started (this is automatic with the Ashland Sedimentation Program). After 60 minutes and after 18-24 hours with the maximum compaction reached, the final volume is recorded, and the clarity is measured. The settling rate and compaction are then calculated using the formula's below. Clarity or Turbidity are used interchangeably and are measured in Nephelometric Turbidity Units (NTU), measurements were done on Model No. 2100Q, made by Hach Inc., Colorado.

Calculations—Settling Rate Determination

Starting Volume=X

End Volume=Y (X−Y)/time=Settling rate

The volume range is between 900 ml and 500 ml to represent the nearly linear region of the settling curve.

The ground ore characteristics for North American mine gold ore used in the study are shown in Table 1 below.

TABLE 1

Particle size for un-ground and ground ore with and without additive

| | Particle Size | |
|---|---|---|
| Type | Mean Particle Size m micrometer (μm) | Median Particle Size (μm) |
| Ball Mill Feed -un-ground ore | (1 millimeter (mm) dominant, visually) | |
| Blank - ground ore | 125.7 | 85.1 |
| Zalta ™ GR20-588 - ground ore | 115.1 | 74.3 |

*Zalta is a trade name for Solenis LLC (formerly Ashland Inc.) mining product having anionic functionality.

In Table 1, a ball mill feed size gold ore from a North American mine was ground ball milled as received from a North America mine. The ore was ground to a desired particle size distribution according to standard classification processing. The ore was diluted to 60 wt % solids in water, using the procedure described above. The particles size of the ground ore indicates significant reduction in size due to grinding with and without additive.

In all of the following examples, the flocculants are characterized as having low (LV), medium (MV), high (HV) or highest viscosity (HHV) and with charge (Mole %) of low charge (LC), medium charge (MC) or high charge (HC). These designations found in Table 2 below are according to the acronyms in Table 3, Table 4 and Table 6.

TABLE 2

Viscosity and Charge Designations of Flocculants

| Range | Characteristics | | |
|---|---|---|---|
| | Viscosity (Anionic) 0.5% in 10% NaCl (cP) | Viscosity (Cationic) 1.0% in 10% NaCl (cP) | Charge (Mol %) |
| Low | — | — | 0 to ±10 |
| Medium | <90 | 400 to 700 | ±10 to ±17 |
| High | 90 to 230 | >700 | >±18 |
| Highest | >230 | — | — |

Examples (Comparative) 1-17

In the following Examples, the products Hyperfloc™ and Praestol™/Drewfloc™/Zalta™ are commercial products available from Hychem Inc. and Solenis, LLC (formerly Ashland Inc.), respectively.

Examples 1-17, are summarized in Table 3. In Examples 1-17, the North American gold ore was ground at 60 wt % solids and then diluted down with water to 10 wt % for solid-liquid-separation, i.e. flocculation experiments. The experiments were conducted as described above. All comparative examples in the study were conducted without grinding aid present in the ore, i.e. for blank grinding tests.

TABLE 3

Flocculation data for North American gold ore post ground in lab ball mill, comparative examples conducted without grinding aid.

| Cylinder/Test/ Example # | Grinding Aid | Grinding Aid Dosage (WT %) | Flocculant Type* | Flocculant Dosage (g/ton of dry ore) | Settling Rate (meters/hour) | 1 Hour Turbidity (NTU) | 18 Hour Turbidity (NTU) |
|---|---|---|---|---|---|---|---|
| Comparative 1 | Blank | 0 | anionic-sulfonated, HHV, MC | 15 | 24.4 | 36.9 | 13.4 |
| Comparative 2 | Blank | 0 | same as above | 30 | 42.0 | 28.6 | 16.6 |
| Comparative 3 | Blank | 0 | anionic-carboxylated, HV, HC | 15 | 10.0 | 66.8 | 17.2 |
| Comparative 4 | Blank | 0 | cationic MV, LC | 15 | 11.6 | 81.4 | 20.1 |
| Comparative 5 | Blank | 0 | same as above | 30 | 25.5 | 27.9 | 16.5 |
| Comparative 6 | Blank | 0 | same as above | 60 | 45.2 | 17.8 | 11.3 |
| Comparative 7 | Blank | 0 | cationic, HV, MC | 15 | Very slow | Very slow | 19.8 |
| Comparative 8 | Blank | 0 | cationic, HV, MC | 15 | 8.5 | 95.9 | 20.3 |
| Comparative 9 | Blank | 0 | anionic-sulfonated, HV, HC | 30 | 46.6 | 98.7 | 51.4 |
| Comparative 10 | Blank | 0 | anionic-sulfonated, HV, MC | 30 | 56.1 | 17.8 | 15.3 |
| Comparative 11 | Blank | 0 | anionic-carboxylated, HHV, HC | 30 | 27.0 | 17.5 | 13.2 |
| Comparative 12 | Blank | 0 | anionic-carboxylated, HV, LC | 30 | 37.3 | 23.3 | 17.7 |
| Comparative 13 | Blank | 0 | anionic-sulfonated, HV, LC | 30 | 47.4 | 57.6 | 10.0 |
| Comparative 14 | Blank | 0 | anionic-sulfonated, HV, HC | 30 | 44.0 | 110.2 | 12.5 |
| Comparative 15 | Blank | 0 | anionic-sulfonated-carboxylated, HV, LC | 30 | 39.0 | 163.0 | 14.3 |
| Comparative 16 | Blank | 0 | anionic-sulfonated-carboxylated, HV, MC | 30 | 36.7 | 106.0 | 14.4 |
| Comparative 17 | Blank | 0 | anionic-sulfonated-carboxylated HV, HC | 30 | 36.4 | 43.1 | 14.1 |

*HV—high viscosity; HHV—highest viscosity; MV—medium viscosity; LC—low charge; MC—medium charge; HC—high charge. Settling rates have about a 5% standard deviation.

All the settling rate tests in Table 4 and Table 6 were conducted, at least, in duplicate. Standard deviation is within 5%.

The monomers composing polymer flocculants may include a range of chemicals such as acrylic acid (AA), acrylamide (AAm), 2-acrylamido-2-methylpropanesulfonic acid (AMPS), acrylamidopropyl trimethylammonium chloride (APTAC), dimethylammoniummethyl (meth)acrylate quaternized with methyl chloride (ADAMEQuat), dimethylaminoethyl methacrylate quaternized with methyl chloride (DMAEMAQuat) and other anionic and cationic functionalities put together in various combinations, while the final polymer architecture can be linear, branched or cross-linked.

In Comparative Example 1, a flocculation test was conducted using the ground gold ore described above, wherein the gold ore was diluted to 10 wt %. The rate of flocculation or settling rate of the ore was determined after the slurry was treated at a flocculant dosage level of 15 g/ton by wt. ore using Hyperfloc™ 655, an anionic flocculant, containing sulfonated groups. The ore settled relatively fast with some, but not excessive turbidity of the supernatant.

Comparative Example 2, was conducted using the same Hyperfloc™ 655 product as in Comparative Example 1, except the amount of flocculant used was 30 g/ton by wt. ore. Results show that the ore slurry settling rate increased, while supernatant turbidity decreased as a result of the higher dose level of the flocculant.

Comparative Examples 3, was conducted using Praestol™ 2540, an anionic, carboxylated, high viscosity and high charge flocculant product at 15 g/ton of ore dose level. Results indicate the gold ore settles slower with more residual turbidity of the supernatant compared with the Hyperfloc™ 655 flocculant.

Comparative Example 4, was conducted using Praestol™ 610 BC, a cationic flocculant with medium viscosity and low charge. This product performs comparable to Praestol™ 2540 at 15 g/ton of ore dose level.

Comparative Example 5, was conducted using Praestol™ 610 BC flocculant at a dosage level of 30 g/ton by wt. ore. The performance of Praestol™ 610 BC clearly improves at the higher flocculant dosage level and was comparable with the performance of the Hyperfloc™ 655 flocculant that was used at half a dose level, i.e. 15 g/ton of ore.

Comparative Example 6, shows results when using Praestol™ 610 BC at flocculant dosage levels of 60 g/ton by wt. of ore. Performance of this product further improves compared with lower dose levels.

Comparative Example 7, was conducted using Drewfloc™ 442, a cationic flocculant, having the properties described in Table 3, at a dosage level of 15 g/ton by wt. ore. This resulted in poor flocculation with a very slow settling rate and a turbidity that was too high for the instrument to record the data.

Comparative Example 8, was conducted using Praestol™ 611 BC, a cationic flocculant of medium viscosity and medium charge at a dosage level of 15 g/ton by wt. of ore. The product performed better than Drewfloc™ 442, but still poorer compared with most other products tested.

Comparative Example 9, was conducted using Praestol™ 2740 an anionic, sulfonated, flocculant of high viscosity and high charge at a dosage level of 30 g/ton by wt. ore. The product did not perform as well as with Hyperfloc™ 655 tested at the same dose level. Although the Praestol™ 2740 showed similar settling rates, the clarity of the liquid phase after ore settling was worse.

Comparative Example 10, was conducted using Zalta™ MF 1735, an anionic, sulfonated, flocculant of high viscosity and medium charge at a dosage level of 30 g/ton by wt. ore. Zalta™ MF 1735 performed better than Hyperfloc™ 655, when tested at the same dose level, showing a faster settling rate and better clarity of the liquid phase.

Comparative Example 11, was conducted using Praestol™ 2640, an anionic, carboxylated, flocculant having the highest viscosity of the flocculants tested and high molar charge at 30 g/ton by wt. of ore. Results showed a settling rate of 27.0 meters per hour and a 1 hour turbidity of 17.5 NTU.

Comparative Example 12, was conducted using Praestol™ 2510, an anionic, carboxylated, flocculant of high viscosity and low charge and at flocculant dosage levels of 30 g/ton by wt. ore. Praestol™ 2510 showed good overall performance having a settling rate of 37.3 and a 1 hour turbidity of 23.3 NTU.

Examples 13-47, summarize the results for laboratory products made by Solenis LLC (formerly Ashland Inc.).

Comparative Example 13 was conducted with an anionic, 5 mol % sulfonated, product with a viscosity of 130 cP at 30 g/ton of ore dose level. Results showed comparable sedimentation rate as shown by Praestol™ 2740 and Hyperfloc™ 655, while a bit worse in clarity of liquid phase.

Comparative Example 14 was conducted with an anionic, 23 mol % sulfonated, product with a viscosity of 950 at 30 g/ton of ore dose level. The product performance was comparable in sedimentation rate to the 5 mol % sulfonated product (see Example 13), while it showed a bit worse clarity of liquid phase.

The products discussed in Comparative Examples 15-17 below, contained about equimolar amounts of carboxylated and sulfonated functionalities.

Comparative Example 15 was conducted with an anionic, 2.5 mol % carboxylated, 2.5 mol % sulfonated, product with a viscosity of 160 cP at 30 g/ton of ore dose level. The product performance was poorer in both sedimentation rate and clarity of liquid phase compared to the 5 mol % sulfonated and 23 mol % sulfonated products (see Comparative Example 13 and 14).

Comparative Example 16 was conducted with an anionic, 6.5 mol % carboxylated, 6.5 mol % sulfonated, product with a viscosity of 140 cP at 30 g/ton of ore dose level. The product performance was comparable in sedimentation rate to the 2.5 mol % carboxylated, 2.5 mol % sulfonated product, but better in clarity of liquid phase (See Comparative Example 15).

Comparative Example 17 was conducted with an anionic, 16 mol % carboxylated, 16 mol % sulfonated, product with a viscosity of 110 cP at 30 g/ton of ore dose level. The product performance was comparable in sedimentation rate to the 6.5 mol % carboxylated, 6.5 mol % sulfonated product, but better in clarity of liquid phase (see Comparative Example 16).

TABLE 4

Flocculation data for North American gold ore post ground in lab ball mill, invention examples conducted with grinding aid.

| Cylinder/Test/Example # | Grinding Aid | Grinding Aid Dosage (WT %) | Flocculant Type* | Flocculant Dosage (g/ton of dry ore) | Settling Rate (meters/hour) | 1 Hour Turbidity (NTU) | 18 Hour Turbidity (NTU) |
|---|---|---|---|---|---|---|---|
| 18 | Zalta GR20-588 | 0.0625 | anionic-sulfonated, HHV, MC | 30 | Too Turbid | 504 | 99.1 |
| 19 | Zalta GR20-588 | 0.0625 | same as above | 60 | Too Turbid | 789 | 120 |
| 20 | Zalta GR20-588 | 0.0625 | cationic, MV, LC | 30 | 36.2 | 112.5 | 13.0 |
| 21 | Zalta GR20-588 | 0.0625 | cationic, HV, MC | 30 | Too Turbid | Too Turbid | 20.1 |
| 22 | Zalta GR20-588 | 0.0625 | anionic-carboxylated, HV, LC | 30 | Too Turbid | 594 | 41.4 |
| 23 | Zalta GR20-588 | 0.0625 | anionic-carboxylated, HHV, HC | 30 | 33.9 | 395.0 | 42.5 |
| 24 | Zalta GR20-588 | 0.0625 | anionic-sulfonated, HV, MC | 30 | 34.0 | 247.5 | 43.5 |
| 25 | Zalta GR20-588 | 0.0625 | same as above | 60 | Very Fast | 49.9 | 43.1 |
| 26 | Zalta GR20-588 | 0.0625 | anionic-sulfonated, HV, HC | 30 | Too Turbid | Too Turbid | 41.5 |
| 27 | Zalta GR20-588 | 0.0625 | anionic-sulfonated, HV, LC | 30 | 45.3 | 158.5 | 22.4 |
| 28 | Zalta GR20-588 | 0.0625 | anionic-sulfonated, HV, HC | 30 | Too Turbid | Too Turbid | 32.3 |
| 29 | Zalta GR20-588 | 0.0625 | anionic-sulfonated-carboxylated, HV, LC | 30 | 35.0 | 240.0 | 20.3 |
| 30 | Zalta GR20-588 | 0.0625 | anionic-sulfonated-carboxylated, HV, MC | 30 | 36.3 | 258.5 | 22.9 |
| 31 | Zalta GR20-588 | 0.0625 | anionic-sulfonated-carboxylated, HV, HC | 30 | Too Turbid | Too Turbid | 52.3 |
| 32 | Zalta GR20-588 | 0.125 | anionic-sulfonated, HHV, MC | 15 | Very Slow | Very Slow | 115.0 |
| 33 | Zalta GR20-588 | 0.125 | same as above | 60 | Very Slow | Very Slow | 682.0 |
| 34 | Zalta GR20-588 | 0.125 | cationic, MV, LC | 30 | 18.9 | 636 | 101 |
| 35 | Zalta GR20-588 | 0.125 | same as above | 60 | 44.0 | 30.9 | 16.9 |
| 36 | Zalta GR20-588 | 0.125 | cationic, MV, MC | 60 | 33.1 | 63.4 | 15.9 |
| 37 | Zalta GR20-588 | 0.125 | anionic-carboxylated, HV, HC | 60 | Very Slow | Too Turbid | — |

*HV—high viscosity; HHV—highest viscosity; MV—medium viscosity; LC—low charge; MC—medium charge; HC—high charge.
Settling rates have about a 5% standard deviation.

Examples 18-37

Examples 18-37, are summarized in Table 4. The North American gold ore used in Examples 1-17 was ground at 60 wt % solids and then diluted down with water to 10 wt % for solid-liquid-separation, i.e. flocculation experiments. The experiments were conducted as described earlier.

Examples 18-37, were conducted with grinding aid present in the ore. Grinding aid product was added to the ore with water at grinding aid dosage levels of 0.0625 wt % (Examples 18-31) and 0.125 wt % (Examples 32-37) per wt. dry ore prior to grinding the ore in a ball mill.

Example 18, was conducted using Hyperfloc™ 655, an anionic, sulfonated, product used at flocculant dosage levels of 30 g/ton by wt. ore with the ore slurry containing grinding aid, Zalta™ GR20-588. Compared with Example 1 and 2, without grinding aid present, the Hyperfloc™ 655 product resulted in the turbidity of the liquid phase being too high to measure the settling rate and the 1 hour turbidity remained high, 504 nephelometric turbidity unit (NTU).

Example 19, was conducted using Hyperfloc™ 655 flocculant at a dosage level of 60 g/ton by wt. ore with the ore slurry containing grinding aid, Zalta™ GR20-588. An increase in flocculant dose level did not result in any flocculation improvement, i.e. the turbidity of the liquid phase was still high, and hence the measurements of the settling rate were impossible to conduct. The turbidity was high at 789 NTU even after 1 hour past the beginning of the test.

Example 20, was conducted using Praestol™ 610 BC, cationic flocculant, with medium viscosity and low charge at 30 g/ton of ore dose level. Compared with the same flocculant tested without grinding aid, Example 5, the product had a faster settling rate, but poorer clarity of the liquid phase was observed.

Example 21, was conducted using Drewfloc™ 442 cationic flocculant, which has a high viscosity and medium charge at a dosage level of 30 g/ton by wt. of ore dose level. Compared with Example 3, without grinding aid, Drewfloc™ 442 flocculant had a turbidity of the liquid phase so high, that the measurements of settling rate were impossible to conduct. The turbidity remained high even 1 hour after the beginning of the test, which is not typical.

Example 22, was conducted using Praestol™ 2510, anionic, carboxylated, flocculant of high viscosity and low charge at 30 g/ton of ore dose level. Compared with Example 12, without grinding aid present, the product did not perform as well, i.e. with the turbidity of the liquid phase being so high, that the measurements of the settling rate were impossible conduct.

Example 23, was conducted using Praestol™ 2640, an anionic, carboxylated, flocculant having the highest viscosity tested and a high molecular charge at flocculant dosage levels of 30 g/ton by wt. ore. Compared with Example 11, without grinding aid present, the flocculant had a better settling rate, but the liquid phase turbidity was higher.

Example 24, was conducted with Zalta™ MF 1735, an anionic, sulfonated, flocculant of high viscosity and medium charge at 30 g/ton of ore dose level. Compared with Example 10, without grinding aid present, the product had a slower settling rate and poorer clarity of the liquid phase. However, Zalta™ ME 1735 had a less turbid liquid phase than Example 23.

Example 25, was conducted using Zalta MF 1735 flocculant, but at twice the dose level as used in Example 24, 60 g/ton by wt. ore. The ore had a settling rate to fast to record and good clarity of the liquid phase.

Example 26, was conducted using Praestol™ 2740, an anionic, sulfonated, flocculant having high viscosity and high charge at a dosage of 30 g/ton by wt. ore. The turbidity was too high to conduct the measurements.

Examples 27-31, were conducted using developmental Ashland products.

Example 27, was conducted using an anionic, 5 mol % sulfonated, product with a viscosity of 130 cP at 30 g/ton of ore dose level. Compared with Example 13, without grinding aid present, the settling rate was comparable, while the turbidity of liquid phase when grinding aid was present, was higher.

Example 28, was conducted using an anionic, 23 mol % sulfonated, product with a viscosity of 95 cP at 30 g/ton of ore dose level. The resulting turbidity was too high to conduct the measurements.

Example 29, was conducted using an anionic, 2.5 mol % carboxylated, 2.5 mol % sulfonated, product with a viscosity of 160 cP at 30 g/ton of ore dose level. Compared with Example 15, without grinding aid present, the settling rates were about the same, while the turbidity of the liquid phase of the ore without the grinding aid was a bit higher.

Example 30, was conducted with an anionic, 6.5 mol % carboxylated, 6.5 mol % sulfonated, product with a viscosity of 140 cP at 30 g/ton of ore dose level. Compared with the Example 16, without grinding aid present, the settling rate was about the same, while the turbidity of liquid phase was higher for the ore without grinding aid present.

Example 31, was conducted with an anionic, 16 mol % carboxylated, 16 mol % sulfonated, product with a viscosity of 110 cP at 30 g/ton of ore dose level. The resulting turbidity was too high to conduct the measurements.

Examples 32-37, were conducted by increasing the grinding aid dosage level to 0.125% by wt. ore.

Example 32, was conducted using Hyperfloc™ 655, an anionic, sulfonated, flocculant that had the highest viscosity of the flocculants tested and a medium charge. When used in combination with 0.125% by wt, ore of Zalta™ GR20-588 grinding aid and a flocculant dosage level of 15 g/ton by wt. ore, the resulting product had nearly no settling and excessive turbidity.

Example 33, was conducted as above using Hyperfloc™ 655 as the flocculant, but at higher dosage levels of 60 g/ton by wt. ore. The results were essentially identical to those of Example 32.

Example 34, was conducted using Praestol™ 610 BC cationic flocculant having a medium viscosity and low charge, at flocculant dosage levels of 30 g/ton by wt. ore. The settling rate for the combination grinding aid and flocculant was faster than without the grinding aid. However, the resulting turbidity of the flocculant in combination with the grinding aid was significantly higher (see Example 5) showing the counteraction of the grinding aid with the flocculant.

Example 35, was conducted using Praestol™ 610 BC cationic flocculant at flocculant dosage levels of 60 g/ton by wt. ore. The flocculation proceeded with good efficacy resulting in a settling rate of 44.0 meters/hour and good clarity of supernatant. Surprisingly, at 60 g/ton dose levels, the overall performance of the flocculant was nearly as good as without grinding aid. The settling rate was comparable, while the turbidity was higher.

Example 36, was conducted using cationic Drewfloc™ 410, medium charge and medium viscosity product, at a dosage of 60 g/ton by wt. ore. At this dose level, the flocculation was clearly detectable and resulted in a better settling rate than the ore without the grinding aid, but had a higher turbidity.

Example 37, was conducted using Praestol™ 2540, an anionic, carboxylated, flocculant with high charge and high viscosity, at flocculant dosage levels of 60 g/ton by wt. ore. The outcome of the test was similar to the anionic product—Hyperfloc™ 655, i.e. showing no flocculation efficacy with nearly no settling and a turbidity to high for measurements to be taken.

The above examples illustrate that selection of a flocculant can be critical in order to achieve improved compatibility between anionic grinding aids and flocculants with minimum negative impact on flocculation processes. Cationic flocculants and sulfonated anionic flocculants are more compatible with anionic grinding aids compared with carboxylated flocculants. Improved compatibility results in higher tolerance of grinding aid at higher dose levels without strong negative impact on flocculation processes.

The ground ore characteristics for South American mine gold ore are shown in Table 5 below.

TABLE 5

Particle size for mi-ground and ground ore with and without additive

| Type | Particle Size | |
|---|---|---|
| | Mean Particle Size (nm) | Median Particle Size (μm) |
| Ball Mill Feed -un-ground ore | (80% material below 1 mm) | |
| Blank - ground ore | 23.65 | 10.1 |
| Zalta ™ GR20-588 - ground ore | 22.32 | 12.17 |

*Zalta is the trade name for Ashland Inc. mining product. This product has anionic functionality.

In the examples of Table 5, we ground, ball mill feed gold ore, as received from South American mine, prepared at 65 wt % solids in water, using the procedure described earlier. The particles size of the ground ore indicates significant reduction in size due to grinding with and without additive.

Examples (Comparative) 38-48

Examples 38-42, are summarized in Table 6. In these examples, the South American gold ore was ground at 65 wt % solids and then diluted down with water to 10 wt % for solid-liquid-separation, i.e. flocculation, experiments. The experiments were conducted as described above. Comparative examples were conducted without grinding aid present in the ore, i.e. for blank grinding tests.

TABLE 6

Flocculation data for South American gold ore post ground in lab ball mill, comparative and invention examples conducted without and with added grinding aid respectively.

| Cylinder/ Test/ Example # | Grinding Aid | Grinding Aid Dosage (WT %) | Flocculant Type* | Flocculant Dosage (g/ton of dry ore) | Settling Rate (meters/hour) | 1 Hour Turbidity (NTU) |
|---|---|---|---|---|---|---|
| Comparative 38 | Blank | 0 | anionic-carboxylated, HV, HC | 60 | 30.1 | 11.2 |
| 39 | Zalta GR20-588 | 0.005 | anionic-carboxylated, HV, HC | 60 | 33.1 | 24.6 |
| 40 | Zalta GR20-588 | 0.005 | anionic-carboxylated, HV, MC | 37.5 | 8.2 | 26.5 |
| 41 | Zalta GR20-588 | 0.01 | anionic-carboxylated, HV, HC | 60 | 15.6 | 30.5 |
| 42 | Zalta GR20-588 | 0.01 | anionic-carboxylated, HV, HC | 90 | 36.7 | 24.4 |

*HV—high viscosity; HC—high charge.

All the settling rate tests in Table 6, were conducted, at least in duplicate. Standard deviation was within 5%.

In the following examples, Zalta™ and Praestol™ products were used and are commercial available from Solenis LLC, formerly Ashland Inc.

Comparative Examples 38, was conducted using Praestol™ 56640, an anionic, carboxylated, high viscosity and high charge flocculant product at 60 g/ton of ore dose level. In this case, the gold ore settled relatively fast, resulting in a clear supernatant.

Examples 39-42 were conducted using variable amounts of Zalta™ GR20-588 grinding aid and Praestol™ 56640 flocculant.

Example 39, was conducted using a grinding aid dosage level of 0.005 wt % per dry ore and 60 g/ton by wt. ore dosing levels of Praestol™ 56640 flocculant. Compared with Example 38, without grinding aid present, the product slurries had comparable settling rates, while turbidity of the supernatant after 1 hour was higher compared with the blank (no grinding aid), but still resulted in a relatively clear supernatant.

Example 40, was conducted with the same amount of grinding aid and a lower amount of flocculant—37.5 g/ton of ore as in Example 39. Settling rate decreased significantly, while the turbidity of supernatant was about the same as in the example 39.

Example 41, was conducted using 0.01 wt % per dry ore, which are lower when compared with the tests conducted using North American ore, Table 4. The same flocculant was added at 60 g/ton by wt. ore, as in the examples 38-40. The settling rate was 2 times lower compared with example 39, but higher compared with example 40. Turbidity of supernatant was about the same.

Example 42, was conducted using 0.01 wt % per dry ore of grinding aid and 1.5 times higher amount of Praestol™ 56640 flocculant, i.e. 90 g/ton of ore. Settling rate was faster compared with the lower amount of Praestol™ 56640 and also had a faster settling rate than the blank. The turbidity improved compared with the blank and decreased compared with Example 41, which had a dosage level of 30 g/ton Praestol™ 56640 based on dry weight of ore.
Examples 38-41, illustrate the combination of anionic grinding aid and anionic, carboxylated, flocculant.

Extensive experimentation has shown that when using carboxylated flocculants, lower grinding aid and/or higher flocculant concentrations are needed to achieve comparable performance as seen with cationic and sulfonated flocculants (see Table 4).

Variations, modifications, and other implementations of what is described herein will occur to those of ordinary skill in the art without departing from the spirit and the essential characteristics of the present teachings. Accordingly, the invention is intended to include all such modifications and implementations, and their equivalents.

Each reference cited in the present application, including books, patents, published applications, journal articles and other publications, is incorporated herein by reference in their entirety.

What is claimed is:

1. A process of wet grinding and flocculating a mineral ore comprising:
    providing the mineral ore in the presence of a liquid medium and from 0.005 to 0.125 weight percent of at least one carboxylated anionic grinding aid by dry weight of the mineral ore to yield an aqueous slurry;
    grinding the aqueous slurry; and
    subsequently adding from 30 to 90 grams of at least one flocculant per ton of dry mineral ore wherein the at least one flocculant is selected from (1) a quaternized ammonium cationic flocculant, (2) an anionic flocculant containing sulphonated groups, (3) an anionic flocculant containing carboxylated groups, (4) a terpolymer flocculant containing sulphonated and carboxylated groups, or combinations thereof, at a flocculating stage in said process,
    wherein the (1) quaternized ammonium cationic flocculant has a viscosity of from 400 to 700 cP measured at 0.5 wt % in 10% NaCl using a viscometer having a Spindle No. 1 at 10 rpm and at 20° C. and has a charge of 0 to 17 mol %,
    wherein the (2) anionic flocculant containing sulphonated groups has a viscosity of from 90 to 230 cP measured at 0.5 wt % in 10% NaCl using a viscometer having a Spindle No. 1 at 10 rpm and at 20° C. and has a charge of 0 to 17 mol %, wherein the (3) anionic flocculant containing carboxylated groups has a viscosity of at least 90 cP measured at 0.5 wt % in 10% NaCl using a viscometer having a Spindle No. 1 at 10 rpm and at 20° C. and has a charge of greater than 18 mol %, and wherein the (4) terpolymer flocculant containing sulphonated and carboxylated groups has a viscosity of from 90 to 230 cP measured at 0.5 wt % in 10% NaCl using a viscometer having a Spindle No. 1 at 10 rpm and at 20° C. and has a charge of 0 to 17 mol %.

2. The process of claim 1, wherein the aqueous slurry has a mineral ore content of at least 30% by weight.

3. The process of claim 1, wherein the step of grinding is completed using one or more of a ball mill, rod mill, autogenous mill, semi-autogenous mill, pebble mill, high pressure grinding mill, burnstone mill, vertical shift impactor mill, or a tower mill.

4. The process of claim 1, wherein the terpolymer is formed from monomers and the monomers are selected from the group consisting of acrylic acid (AA), acrylamide (AAm), 2-acrylamido-2-methylpropanesulfonic acid (AMPS), acrylamidopropyl trimethylammonium chloride (APTAC), dimethylammoniummethyl(meth)acrylate quaternized with methyl chloride (ADAMEQuat), dimethylaminoethylmethacrylate quaternized with methyl chloride (DMAEMAQuat), and combinations thereof.

5. The process of claim 1 wherein the at least one flocculant is the (1) quaternized ammonium cationic flocculant.

6. The process of claim 5 wherein the at least one carboxylated anionic grinding aid is provided in an amount of from 0.01 to 0.625 percent by dry weight of the mineral ore.

7. The process of claim 5 wherein the least one flocculant is added in an amount of from 30 to 60 grams per ton of dry mineral ore and the at least one carboxylated anionic grinding aid is provided in an amount of from 0.01 to 0.625 percent by dry weight of the mineral ore.

8. The process of claim 1 wherein the at least one flocculant is the (2) anionic flocculant containing sulphonated groups.

9. The process of claim 8 wherein the at least one carboxylated anionic grinding aid is provided in an amount of from 0.01 to 0.625 percent by dry weight of the mineral ore.

10. The process of claim 8 wherein the least one flocculant is added in an amount of from 30 to 60 grams per ton of dry mineral ore and the at least one carboxylated anionic grinding aid is provided in an amount of from 0.01 to 0.625 percent by dry weight of the mineral ore.

11. The process of claim 1 wherein the at least one flocculant is the (3) anionic flocculant containing carboxylated groups.

12. The process of claim 11 wherein the at least one carboxylated anionic grinding aid is provided in an amount of from 0.01 to 0.625 percent by dry weight of the mineral ore.

13. The process of claim 11 wherein the least one flocculant is added in an amount of from 30 to 60 grams per ton of dry mineral ore and the at least one carboxylated anionic grinding aid is provided in an amount of from 0.01 to 0.625 percent by dry weight of the mineral ore.

14. The process of claim 11 wherein the least one flocculant is added in an amount of from 37.5 to 90 grams per ton of dry mineral ore and the at least one carboxylated anionic grinding aid is provided in an amount of from 0.005 to 0.01 percent by dry weight of the mineral ore.

15. The process of claim 1 wherein the at least one flocculant is the (4) terpolymer flocculant containing sulphonated and carboxylated groups.

16. The process of claim 15 wherein the at least one carboxylated anionic grinding aid is provided in an amount of from 0.01 to 0.625 percent by dry weight of the mineral ore.

17. The process of claim 15 wherein the least one flocculant is added in an amount of from 30 to 60 grams per ton of dry mineral ore and the at least one carboxylated anionic grinding aid is provided in an amount of from 0.01 to 0.625 percent by dry weight of the mineral ore.

18. The process of claim 1 wherein the least one flocculant is added in an amount of from 30 to 60 grams per ton of dry mineral ore and the at least one carboxylated anionic grinding aid is provided in an amount of from 0.0625 to 0.125 percent by dry weight of the mineral ore.

19. The process of claim 1 wherein the least one flocculant is added in an amount of from 37.5 to 90 grams per ton of dry mineral ore and the at least one carboxylated anionic grinding aid is provided in an amount of from 0.005 to 0.01 percent by dry weight of the mineral ore.

20. A process of wet grinding and flocculating a mineral ore comprising a mineral selected from gold, aluminum, silver, platinum, copper, nickel, zinc, lead, molybdenum, iron and combinations thereof, said process comprising:

providing the mineral ore in the presence of a liquid medium and from 0.005 to 0.125 weight percent of at least one carboxylated anionic grinding aid by dry weight of the mineral ore to yield an aqueous slurry having a mineral ore content of at least 80% by weight;

grinding the aqueous slurry; and subsequently adding from 30 to 90 grams of at least one flocculant per ton of dry mineral ore wherein the at least one flocculant is selected from (1) a quaternized ammonium cationic flocculant, (2) an anionic flocculant containing sulphonated groups, (3) an anionic flocculant containing carboxylated groups, (4) a terpolymer flocculant containing sulphonated and carboxylated groups, or combinations thereof, at a flocculating stage in said process, wherein the (1) quaternized ammonium cationic flocculant has a viscosity of from 400 to 700 cP measured at 0.5 wt % in 10% NaCl using a viscometer having a Spindle No. 1 at 10 rpm and at 20° C. and has a charge of 0 to 17 mol %, wherein the (2) anionic flocculant containing sulphonated groups has a viscosity of from 90 to 230 cP measured at 0.5 wt % in 10% NaCl using a viscometer having a Spindle No. 1 at 10 rpm and at 20° C. and has a charge of 0 to 17 mol %, wherein the (3) anionic flocculant containing carboxylated groups has a viscosity of at least 90 cP measured at 0.5 wt % in 10% NaCl using a viscometer having a Spindle No. 1 at 10 rpm and at 20° C. and has a charge of greater than 18 mol %, and wherein the (4) terpolymer flocculant containing sulphonated and carboxylated groups has a viscosity of from 90 to 230 cP measured at 0.5 wt % in 10% NaCl using a viscometer having a Spindle No. 1 at 10 rpm and at 20° C., has a charge of 0 to 17 mol %, and is formed from monomers selected from acrylic acid (AA), acrylamide (AAm), 2-acrylamido-2-methylpropanesulfonic acid (AMPS), acrylamidopropyl trimethylammonium chloride (APTAC), dimethylammoniummethyl(meth) acrylate quaternized with methyl chloride (ADAME- Quat), dimethylaminoethylmethacrylate quaternized with methyl chloride (DMAEMAQuat), and combinations thereof.

* * * * *